(12) United States Patent
Van Treeck et al.

(10) Patent No.: US 12,479,060 B2
(45) Date of Patent: Nov. 25, 2025

(54) ORBITAL POLISHING TOOL

(71) Applicant: MILWAUKEE ELECTRIC TOOL CORPORATION, Brookfield, WI (US)

(72) Inventors: John Michael Q Van Treeck, Lannon, WI (US); Kyle W. Schultz, Mequon, WI (US); Jonathan E. Wojtalik, Mt. Prospect, IL (US); Trevor L. Paff, Slinger, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 311 days.

(21) Appl. No.: 18/144,426

(22) Filed: May 8, 2023

(65) Prior Publication Data

US 2023/0356349 A1 Nov. 9, 2023

Related U.S. Application Data

(60) Provisional application No. 63/339,655, filed on May 9, 2022.

(51) Int. Cl.
 *B24B 23/04* (2006.01)
(52) U.S. Cl.
 CPC .................................... *B24B 23/04* (2013.01)
(58) Field of Classification Search
 CPC ......... B25F 5/008; B24B 55/05; B24B 23/02; B24B 55/10
 See application file for complete search history.

(56) References Cited

U.S. PATENT DOCUMENTS

| | | | |
|---|---|---|---|
| 3,781,579 A | 12/1973 | Rosenthal, Jr. et al. | |
| 5,680,854 A * | 10/1997 | Kingsley | B28D 1/045 299/39.3 |
| 6,518,719 B1 | 2/2003 | Suzuki et al. | |
| 7,954,348 B2 | 6/2011 | Forgues et al. | |
| 8,657,030 B2 | 2/2014 | Du et al. | |
| 9,061,392 B2 | 6/2015 | Forgues et al. | |
| 10,391,599 B2 | 8/2019 | Yoshida et al. | |
| 10,549,396 B2 | 2/2020 | Matsunaga et al. | |
| 10,668,613 B2 | 6/2020 | Ogle et al. | |
| 10,814,470 B2 | 10/2020 | Takeda et al. | |

(Continued)

FOREIGN PATENT DOCUMENTS

| | | |
|---|---|---|
| CN | 208409507 U | 1/2019 |
| CN | 208628490 U | 3/2019 |
| WO | 2015025677 A1 | 2/2015 |

*Primary Examiner* — Nathaniel C Chukwurah
(74) *Attorney, Agent, or Firm* — Michael Best & Friedrich LLP

(57) ABSTRACT

A power tool includes a housing. The housing includes a motor housing portion and a handle portion extending rearward from the motor housing portion. A motor is located within the motor housing portion. A variable speed dial is coupled to the housing, and the variable speed dial is configured to adjust a maximum rotary speed of the motor. A trigger is coupled to the housing proximate the handle portion. The trigger is configured to be actuated in a plurality of positions between an undepressed position and a maximally depressed position to selectively activate the motor. A constant speed setting switch is configured to lock a rotary speed of the motor determined by the adjustment of the variable speed dial and a depressed position of the trigger.

20 Claims, 4 Drawing Sheets

(56) References Cited

U.S. PATENT DOCUMENTS

| | | |
|---|---|---|
| 2011/0088921 A1 | 4/2011 | Forgues et al. |
| 2013/0240230 A1 | 9/2013 | Saur |
| 2015/0256111 A1* | 9/2015 | Forster .................... H02P 6/14 |
| | | 318/400.27 |
| 2018/0248507 A1* | 8/2018 | Vanko .................... H02P 29/50 |
| 2018/0297179 A1 | 10/2018 | Osada et al. |
| 2019/0084107 A1* | 3/2019 | Yabuguchi ............... H02P 6/24 |
| 2020/0055159 A1 | 2/2020 | Sakai et al. |
| 2020/0130153 A1 | 4/2020 | Yoneda |
| 2020/0198115 A1 | 6/2020 | Shangguan |
| 2020/0215677 A1 | 7/2020 | Wiedemeier et al. |
| 2021/0008688 A1 | 1/2021 | Kelly et al. |
| 2021/0094163 A1 | 4/2021 | Kato |
| 2021/0304975 A1 | 9/2021 | Fujihara et al. |
| 2021/0313909 A1 | 10/2021 | Fan |

\* cited by examiner

ORBITAL POLISHING TOOL

CROSS-REFERENCE TO RELATED APPLICATION

This application claims priority to U.S. Provisional Patent Application No. 63/339,655 filed on May 9, 2022, the entire content of which is incorporated herein by reference.

FIELD OF THE INVENTION

The present invention relates to a powered oscillating tool, and more particularly to a battery powered orbital polisher.

BACKGROUND OF THE INVENTION

Orbital polishing tools generally include a pad to which an accessory (e.g., a polishing or buffing pad or cover) is attachable for polishing a work surface. In random orbital polishing tools, the assembly can additionally mount the pad to an off axis bearing via an eccentric member that is coupled to the drive shaft of the motor, thereby defining a single eccentric orbit.

SUMMARY OF THE INVENTION

The present invention provides, in one aspect, a power tool comprising a housing including a motor housing portion and a handle portion extending rearward from the motor housing portion, a motor located within the motor housing portion, a variable speed dial coupled to the housing, the variable speed dial configured to adjust a maximum rotary speed of the motor, a trigger coupled to the housing proximate the handle portion, the trigger configured to be actuated in a plurality of positions between an undepressed position and a maximally depressed position to selectively activate the motor, and a constant speed setting switch configured to lock a rotary speed of the motor determined by adjustment of the variable speed dial and a depressed position of the trigger.

The present invention provides, in another aspect, a power tool comprising a housing, a motor located within the housing, a variable speed dial coupled to the housing, a trigger coupled to the housing, a constant speed setting switch coupled to the housing, and a controller electrically connected to the motor, the variable speed dial, the trigger, and the constant speed setting switch. The controller configured to receive a first signal from the variable speed dial to set a maximum rotary speed of the motor, receive a second signal from the trigger to selectively activate the motor at a rotary speed, and receive a third signal from the constant speed setting switch to selectively lock the rotary speed of the motor.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
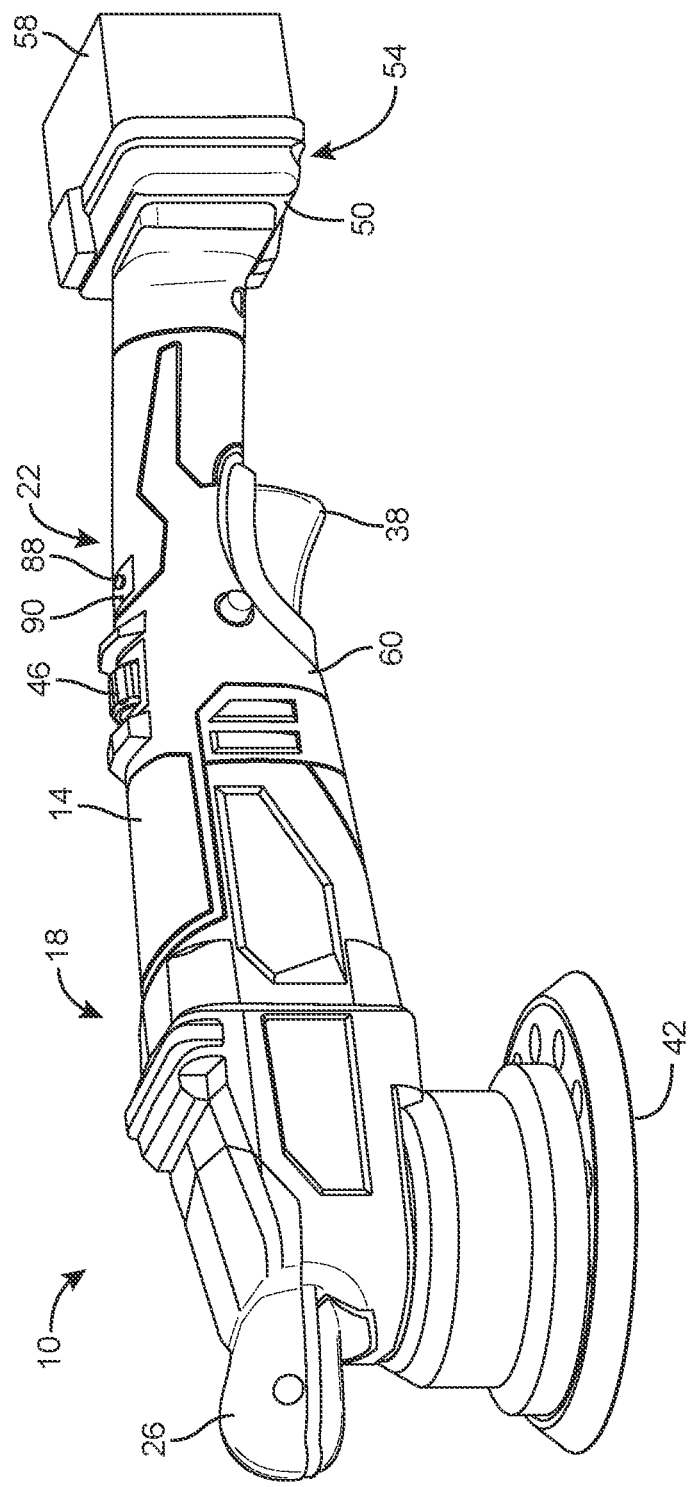
FIG. 1 is a perspective view of a polishing tool in accordance with an embodiment of the invention.
Figure 2:
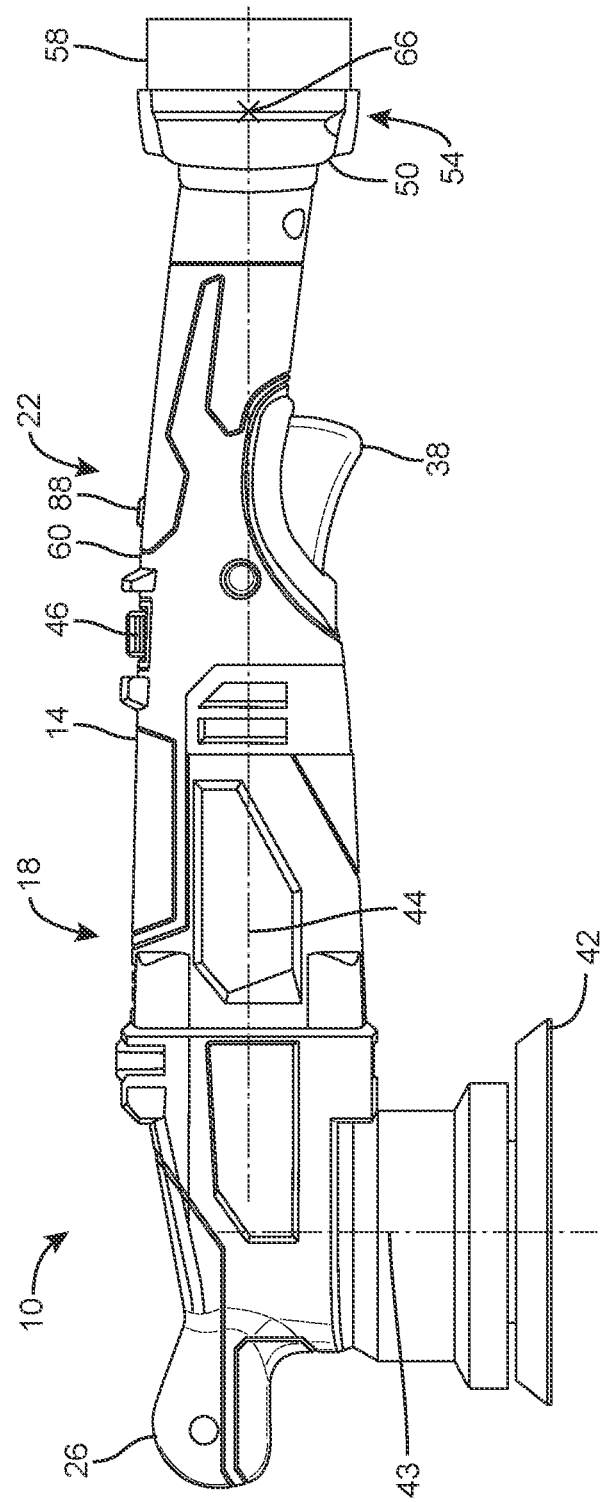
FIG. 2 is a side view of the polishing tool of FIG. 1
Figure 3:
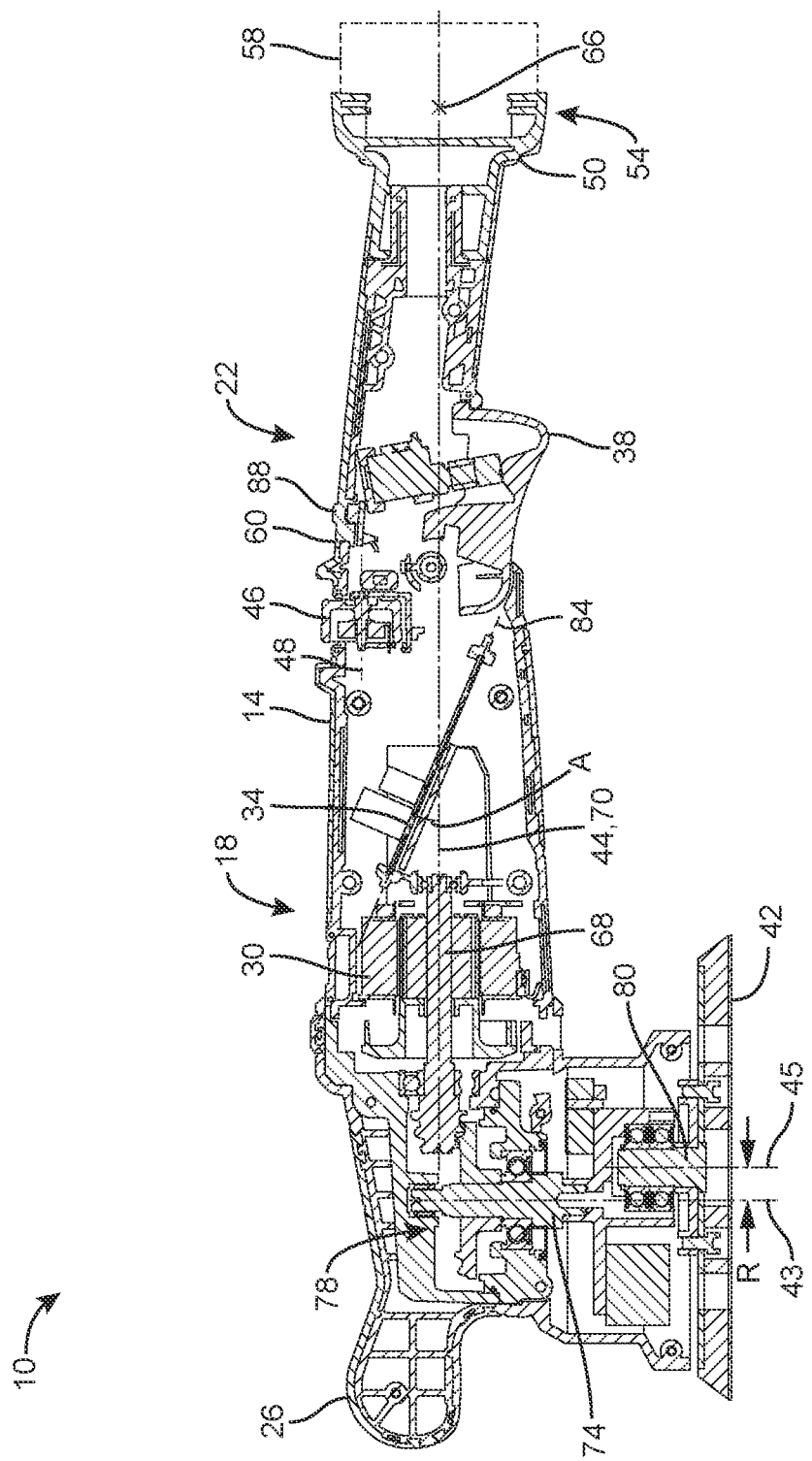
FIG. 3 is a cross-sectional view of the polishing tool of FIG. 1.

FIGS. 1-3 illustrate a power tool 10 including a housing 14 having a motor housing portion 18 and a handle portion 22 extending rearward from the motor housing portion 18. In the illustrated embodiment, the power tool 10 is a polishing or sanding tool. The tool 10 also includes a pommel grip 26 extending from the front of the housing 14, the pommel grip 26 is graspable by a user of the tool 10 in addition to the handle portion 22. The motor housing portion 18 may also be used as an additional, or third, grip portion, as described in more detail below. A brushless electric motor 30 (FIG. 3) and a control unit in the form of a printed circuit board assembly (PCBA) 34 are each located within the motor housing portion 18. The PCBA 34 includes a controller, which controls operation of the motor 30. In some embodiments, the controller may be located away from, but still electrically connected to, the PCBA 34. A trigger 38 extends from the bottom surface of the handle portion 22 and is configured to selectively activate the motor 30 by providing an electrical input to the controller.

The tool 10 includes a backing plate 42 coupled to the motor 30 to receive torque therefrom, causing the backing plate 42 to rotate and/or orbit about parallel first and second vertical axes 43, 45 (FIG. 3), each of which is oriented perpendicular to a horizontal longitudinal axis 44 along which the housing 14 generally extends. A polishing accessory (e.g., a foam or microfiber pad or cover) is attachable to the backing plate 42 for movement therewith.

The handle portion 22 includes a rear end 50 defining a battery receptacle 54 that selectively receives a battery pack 58 and a front end 60 contiguous with a rear of the motor housing portion 18. The battery receptacle 54 defines an attachment axis 66 (FIG. 2) along which a battery pack 58 is slidable for attachment to the battery receptacle 54 to provide electrical power to the PCBA 34 and to the motor 30 when the trigger 38 is depressed.

With reference to FIG. 3, the motor 30 includes a motor shaft 68 that defines a rotational axis 70 which, in the illustrated embodiment of the tool 10, is coaxial with the longitudinal axis 44 of the housing 14. As shown in FIGS. 2 and 3, the attachment axis 66 of the battery receptacle 54 is oriented transverse to each of the rotational axis 70 of the motor 30, the longitudinal axis 44 of the housing 14, and the vertical axis 43. In other words, the attachment axis 66 laterally extends relative to the housing 14 in a horizontal direction, which reduces the height of the tool 10 proximate the rear end 50 of the handle portion 22 (from the frame of reference of FIG. 2).

With reference to FIG. 3, the motor shaft 68 is coupled to an output shaft 74 of the tool 10, which is coaxial with the vertical axis 43, via a right-angle gear train 78. The output shaft 74 (and the vertical axis 43), therefore, is oriented transverse to the rotational axis 70 of the motor 30 and the longitudinal axis 44 of the housing 14. The first vertical axis 43 extends centrally through the output shaft 74 and the second vertical axis 45 extends centrally through a second offset output shaft 80. An orbit radius R is defined as the distance between the first and second vertical axes 43, 45. In some embodiments, the tool 10 may have a first orbit radius (e.g., 15 mm) or a second orbit radius (e.g., 21 mm). In other embodiments, the orbit radius R may be a different value.

The PCBA 34 is positioned within the motor housing portion 18 between the trigger 38 and the motor 30. The PCBA 34 defines a plane 84 that is intersected by the longitudinal axis 44 of the housing 14 and the rotational axis 70 of the motor 30 at an oblique angle A. In the illustrated embodiment, the angle A is in a range between 10 degrees and 60 degrees, and in some embodiments, is about 25 degrees. The inclined orientation of the PCBA 34 reduces the length of the motor housing portion 18 and therefore, the overall length of the housing 14 and the tool 10.

With reference to FIG. 1, the housing 14 has an ergonomic profile to allow the operator to easily grip different portions of the housing 14 during operation. During operation, the user may grasp the handle portion 22 of the tool 10 with one hand and grasp the motor housing 18 or the pommel grip 26 to apply more leverage on the polisher 10.

The tool 10 further includes a variable speed dial 46 positioned on the top surface of the handle portion 22. The illustrated variable speed dial 46 is rotatable about a speed dial axis 48 (FIG. 3) that is parallel with the longitudinal axis 44 of the housing 14. The variable speed dial 46 communicates with the controller to adjust the maximum rotary speed of the motor 30 when the trigger 38 is depressed (FIG. 1). The trigger 38 is a variable speed trigger configured to be actuated in a plurality of positions, between an undepressed position and a maximally depressed position. Each of the plurality of positions may correspond to a different rotary speed of the motor 30. For example, the rotary speed of the motor 30 may be increased as the trigger 38 is pulled toward the maximally depressed position and decreased as the trigger 38 is released toward the undepressed position. Accordingly, the motor 30 will not be activated (i.e., a rotary speed of zero) when the trigger 38 is in the undepressed position, and the motor 30 will operate at the maximum rotary speed, as set by the variable speed dial 46, when the trigger 38 is in the maximally depressed position. The rotary speed of the motor 30 may be proportional to a depression depth of the trigger 38, or the relationship between the rotary speed of the motor 30 and the depression depth of the trigger 38 may be nonlinear. As such, the signal sent to the controller by the trigger 38 is proportional to the depression depth of the trigger 38. In some embodiments, when the trigger 38 is in the maximally depressed position, the signal sent to the controller corresponds to the maximum rotary speed.

Figure 4:
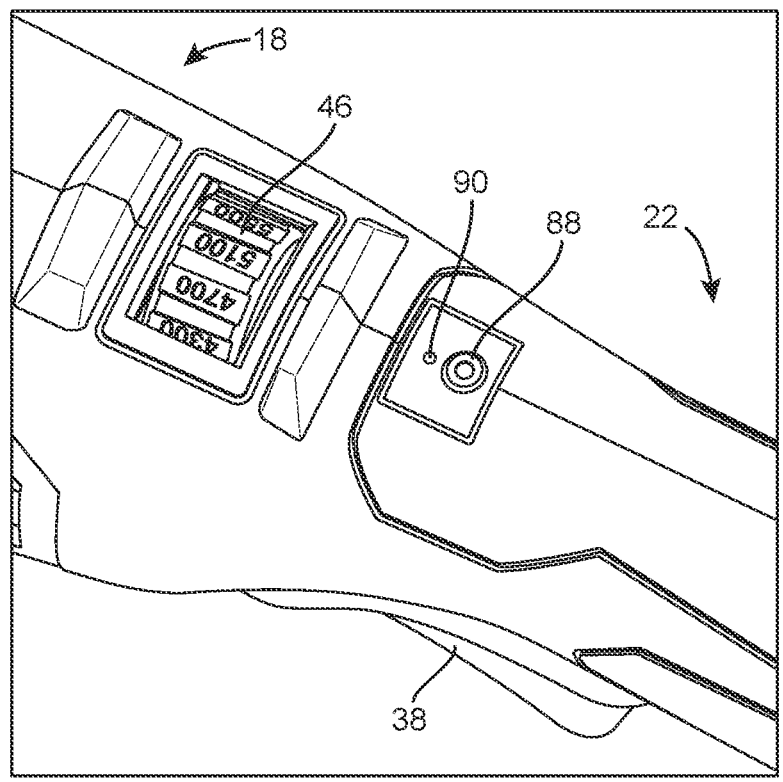
FIG. 4 is an enlarged, perspective view of a portion of the polishing tool of FIG. 1.

With reference to FIG. 4, the tool 10 further includes a constant speed setting switch 88 positioned on the top surface of the handle portion 22. The constant speed setting switch 88 communicates with the controller to lock the rotary speed of the motor 30. As shown in FIG. 1, the constant speed setting switch 88 is coupled to the handle portion 22 of the housing 14. In particular, the constant speed setting switch 88 is positioned between the variable speed dial 46 and the rear end 50 of the handle portion 22. It should be appreciated that while the illustrated tool 10 is a polishing tool 10, that the trigger 38, the variable speed dial 46, and the constant speed setting switch 88 may implemented on other power tools such as grinders, sanders, or the like.

When the constant speed setting switch 88 is actuated (e.g., depressed in a direction into the housing 14) a first instance, the rotary speed of the motor 30 will lock the rotary speed at the current operational speed of the tool 10 (e.g., based on the depression depth of the trigger 38). Accordingly, a user may actuate the constant speed setting switch 88 a first instance and release the trigger 38, with the motor 30 remaining activated, to allow for more comfortable operation of the tool 10. To unlock the rotary speed of the motor 30, the user may actuate the constant speed setting switch 88 a second instance. The tool 10 may further include an indicator 90 (e.g., one or more LED lights) to indicate to the operator that the constant speed switch 88 is activated. In some embodiments, actuation of the trigger 38 may unlock the rotary speed of the motor 30. And, in some embodiments, actuation of the constant speed setting switch 88 a second instance will unlock the rotary speed of the motor 30 such that operational speed of the motor 30 is based on the depression depth of the trigger 38. Further, the motor 30 may be deactivated when the trigger 38 is released to an undepressed position.

Figure 5:
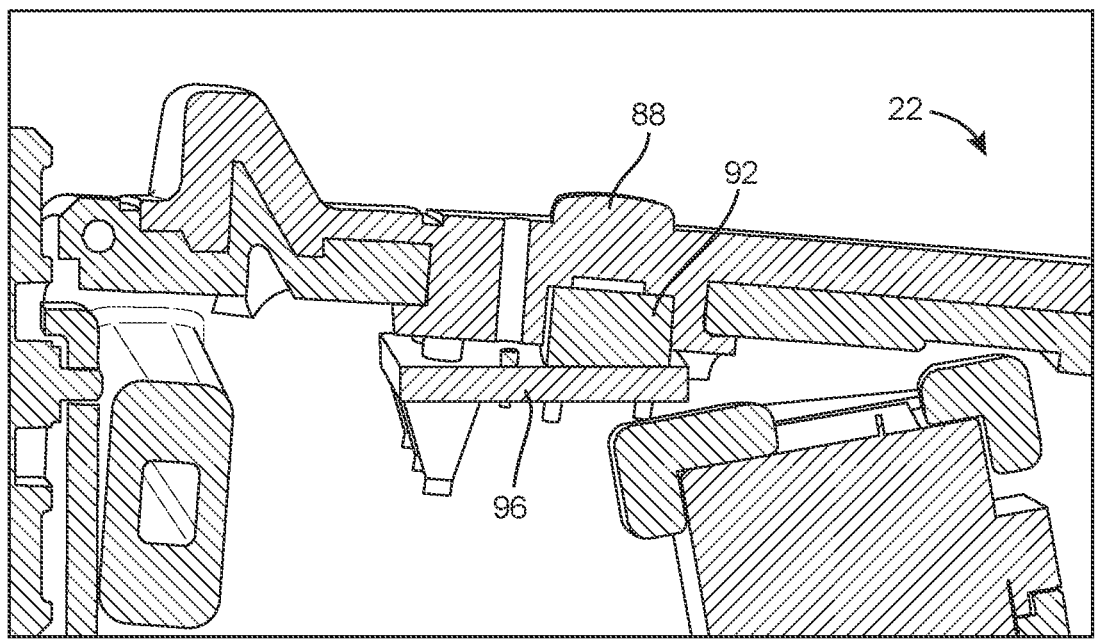
FIG. 5 is a partial cutaway view of the polishing tool of FIG. 1.

In some embodiments, the constant speed setting switch 88 may be configured to lock the rotary speed of the motor 30 electronically. In such embodiments, the constant speed setting switch 88 further includes a momentary switch 92 mounted on a second PCB 96 (FIG. 5). The momentary switch 92 is electrically coupled to the controller and provides an electrical input to the controller or the first PCB 34 when the constant speed setting switch 88 is depressed and released. Actuating the constant speed setting switch 88 the first instance will continue motor activation at the selected speed by the variable speed dial 46 and the variable speed trigger 38. Whereas actuating (e.g., pressing or releasing) the constant speed setting switch 88 the second instance will unlock the rotary speed of the motor 30 such that operational speed of the motor 30 is based on the depression depth of the trigger 38 or, if the trigger 38 remains released by the user, deactivates the motor 30.

In alternative embodiments, the constant speed setting switch 88 may be configured to mechanically lock the rotary speed of the motor 30. In such embodiments, the tool 10 may further include a mechanical locking mechanism (not shown) configured to lock the trigger 38 in its current position when the constant speed setting switch 88 is actuated. The mechanical locking mechanism, for example, may include a linkage system connected to both the constant speed setting switch 88 and the trigger 38, the linkage system configured to move a cam surface into engagement with the trigger 38, such that the trigger 38 is frictionally held in place.

In operation, a user may utilize the trigger 38, variable speed dial 46, and constant speed setting switch 88 in coordination. For example, the user may first rotate the variable speed dial 46 such that the maximum rotary speed of the motor 30 corresponds to the rotary speed desired by the user. The angular position of the variable speed dial 46 sends a maximum speed signal to the controller. The user may then actuate the trigger 38 to the maximally depressed position, thereby sending an actuating signal to the controller to activate the motor 30 to operate at the desired rotary speed. To increase the ease of operation, the user may then actuate the constant speed setting switch 88 a first instance to send a locking signal to the controller. The controller operates the motor 30 at a constant speed to allow the tool 10 to be operated without constant actuation of the trigger 38. In other words, the controller receives a first signal from the variable speed dial to set the maximum rotary speed of the motor, a second signal from the trigger to selectively activate the motor at a rotary speed, and a third signal from the constant speed setting switch to selectively lock the rotary speed of the motor.

When the user is done operating the tool 10 or desires to change the rotary speed of the motor 30, the user may then actuate the constant speed setting switch 88 a second instance or actuate the trigger 38 send an unlock signal to the controller to unlock the rotary speed of the motor 30. Although the aforementioned example describes an exemplary use of the tool 10, it is to be understood that the trigger 38, the variable speed dial 46, and the constant speed setting switch 88 may be used in coordination with the controller to operate the tool in other ways (e.g., the constant speed setting switch 88 may be actuated when the trigger 38 is actuated between the undepressed position and the maximally depressed position).

Although the invention has been described in detail with reference to certain preferred embodiments, variations and modifications exist within the scope and spirit of one or more independent aspects of the invention as described.

Various features of the invention are set forth in the following claims.

What is claimed is:

1. A power tool comprising:
a housing including a motor housing portion and a handle portion extending rearward from the motor housing portion;
a motor located within the motor housing portion;
a variable speed dial coupled to the housing, the variable speed dial configured to adjust a maximum rotary speed of the motor;
a trigger coupled to the housing proximate the handle portion, the trigger configured to be actuated in a plurality of positions between an undepressed position and a maximally depressed position to selectively activate the motor; and
a constant speed setting switch configured to lock a rotary speed of the motor determined by adjustment of the variable speed dial and a depressed position of the trigger.

2. The power tool of claim 1, wherein
the variable speed dial is coupled to the housing proximate the handle portion, and
the constant speed setting switch is coupled to the housing between the variable speed dial and a rear end of the handle portion.

3. The power tool of claim 1, wherein actuating the constant speed setting switch a first instance locks the rotary speed of the motor, and wherein actuating the constant speed setting switch a second instance unlocks the rotary speed of the motor.

4. The power tool of claim 1, wherein actuating the constant speed setting switch locks the rotary speed of the motor, and depressing the trigger unlocks the rotary speed of the motor.

5. The power tool of claim 1, wherein:
the motor is configured to operate at a plurality of rotary speeds between zero and the maximum rotary speed set by the variable speed dial, and
the rotary speed of the motor increases as the trigger moves from the undepressed position to the maximally depressed position, such that the rotary speed of the motor is proportional to the depressed position of the trigger.

6. The power tool of claim 1, further comprising a controller configured to regulate the rotary speed of the motor, and wherein actuation of the constant speed setting switch sends a signal to the controller to lock the rotary speed of the motor.

7. The power tool of claim 1, wherein the housing defines a longitudinal axis, wherein the variable speed dial is rotatable about a speed dial axis, and wherein the longitudinal axis and the speed dial axis are parallel.

8. The power tool of claim 1, wherein the constant speed setting switch is actuatable a first instance to lock the rotary speed of the motor, and wherein the constant speed setting switch is actuatable a second instance to unlock the rotary speed of the motor.

9. The power tool of claim 1, further comprising an indicator to indicate that the constant speed setting switch is activated.

10. The power tool of claim 9, wherein the indicator is an LED light.

11. The power tool of claim 9, wherein the indicator is disposed between the constant speed setting switch and the variable speed dial.

12. A power tool comprising:
a housing;
a motor located within the housing;
a variable speed dial coupled to the housing;
a trigger coupled to the housing;
a constant speed setting switch coupled to the housing; and
a controller electrically connected to the motor, the variable speed dial, the trigger, and the constant speed setting switch, the controller configured to:
receive a first signal from the variable speed dial to set a maximum rotary speed of the motor,
receive a second signal from the trigger to selectively activate the motor at a rotary speed, and
receive a third signal from the constant speed setting switch to selectively lock the rotary speed of the motor.

13. The power tool of claim 12, wherein the variable speed dial is rotatable about a speed dial axis to adjust the maximum rotary speed of the motor, and wherein the first signal is adjusted based on an angular position of the variable speed dial.

14. The power tool of claim 12, wherein the trigger is actuatable between an undepressed portion and a maximally depressed position, and wherein the second signal is proportional to a depressed position of the trigger.

15. The power tool of claim 14, wherein the second signal corresponds to the maximum rotary speed of the motor when the trigger is at the maximally depressed position.

16. The power tool of claim 12, wherein the constant speed setting switch is actuatable a first instance to lock the rotary speed of the motor.

17. The power tool of claim 16, wherein the constant speed setting switch is actuatable a second instance to unlock the rotary speed of the motor.

18. The power tool of claim 16, wherein depressing the trigger unlocks the rotary speed of the motor.

19. The power tool of claim 12, wherein the constant speed setting switch includes a momentary switch electrically coupled to the controller.

20. The power tool of claim 19, wherein the momentary switch provides an electrical input to the controller when the constant speed setting switch is depressed and released.

* * * * *